United States Patent
Bang et al.

(10) Patent No.: US 9,331,313 B2
(45) Date of Patent: *May 3, 2016

(54) BATTERY PACK OF COMPACT STRUCTURE

(75) Inventors: Seung Hyun Bang, Cheongwon-gun (KR); Young Sun Park, Cheongju-si (KR); Chun Yeon Kim, Cheongwon-gun (KR); Ho Sang Kwon, Cheongju-si (KR)

(73) Assignee: LG CHEM, LTD., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/699,470

(22) PCT Filed: May 21, 2011

(86) PCT No.: PCT/KR2011/003742
§ 371 (c)(1),
(2), (4) Date: Mar. 4, 2013

(87) PCT Pub. No.: WO2011/149224
PCT Pub. Date: Dec. 1, 2011

(65) Prior Publication Data
US 2013/0157084 A1    Jun. 20, 2013

(30) Foreign Application Priority Data

May 28, 2010    (KR) .................. 10-2010-0050401

(51) Int. Cl.
*H01M 2/02* (2006.01)
*H01M 2/10* (2006.01)
(Continued)

(52) U.S. Cl.
CPC .............. *H01M 2/0212* (2013.01); *H01M 2/02* (2013.01); *H01M 2/10* (2013.01); *H01M 2/1061* (2013.01);
(Continued)

(58) Field of Classification Search
USPC ................ 429/7, 96–100, 149–160, 163–187
See application file for complete search history.

(56) References Cited

U.S. PATENT DOCUMENTS

2003/0146734 A1 *  8/2003  Kozu .................... H01M 2/021
320/107
2003/0211382 A1   11/2003  Aoyama
(Continued)

FOREIGN PATENT DOCUMENTS

EP    2 506 335 A2    10/2012
JP    11-45689 A    2/1999
(Continued)

OTHER PUBLICATIONS

Machine Translation of Tsutomu et al. (JP 2007-335309, published Dec. 2007, pp. 1-9).*

(Continued)

*Primary Examiner* — Basia Ridley
*Assistant Examiner* — Caitlin Wilmot
(74) *Attorney, Agent, or Firm* — Birch, Stewart, Kolasch & Birch, LLP

(57) ABSTRACT

Disclosed herein is a battery pack including a battery cell array including two or more battery cells, each of which has an electrode assembly of a cathode/separator/anode structure disposed in a battery case together with an electrolyte in a sealed state, arranged in the lateral direction, a protection circuit module (PCM) connected to the upper end of the battery cell array to control the operation of the battery pack, a pack case in which the battery cell array and the protection circuit module are disposed, and a spacer mounted between the pack case and the battery cell array to provide a space accommodating the increase in thickness of the battery cell array during charge and discharge of the battery pack.

16 Claims, 7 Drawing Sheets

(51) Int. Cl.
*H01M 2/12* (2006.01)
*H01M 2/14* (2006.01)
*H01M 2/20* (2006.01)
*H01M 2/34* (2006.01)
*H01M 10/42* (2006.01)
*H01M 2/18* (2006.01)
*H01M 2/16* (2006.01)

(52) U.S. Cl.
CPC .............. *H01M 2/1094* (2013.01); *H01M 2/12* (2013.01); *H01M 2/14* (2013.01); *H01M 2/18* (2013.01); *H01M 2/20* (2013.01); *H01M 2/204* (2013.01); *H01M 2/34* (2013.01); *H01M 10/425* (2013.01); *H01M 10/4257* (2013.01); *H01M 2/162* (2013.01)

(56) References Cited

U.S. PATENT DOCUMENTS

| | | |
|---|---|---|
| 2007/0037054 A1 | 2/2007 | Kikuchi et al. |
| 2008/0280199 A1 | 11/2008 | Kaneta |
| 2009/0297936 A1* | 12/2009 | Nemoto et al. ............... 429/152 |
| 2010/0266891 A1 | 10/2010 | Kwon et al. |
| 2012/0257349 A1* | 10/2012 | Bang et al. ............... 361/679.55 |

FOREIGN PATENT DOCUMENTS

| | | |
|---|---|---|
| JP | 2000-200593 A | 7/2000 |
| JP | 2001-256938 A | 9/2001 |
| JP | 2002-141051 A | 5/2002 |
| JP | 2003-86155 A | 3/2003 |
| JP | 2007-335309 A | 12/2007 |
| JP | 2008-41292 A | 2/2008 |
| JP | 2008-270350 A | 11/2008 |
| KR | 10-2003-0074167 A | 9/2003 |
| KR | 10-2006-0073385 A | 6/2006 |
| KR | 10-0635743 B1 | 10/2006 |
| KR | 10-0880389 B1 | 1/2009 |
| KR | 10-2009-0037769 A | 4/2009 |
| WO | WO 03/103074 A1 | 12/2003 |

OTHER PUBLICATIONS

Machine Translation of Shuya et al. (JP H11-45689, published Feb. 16, 1999, pp. 1-7).*
International Search Report issued PCT/KR2011/003742, mailed on Nov. 23, 2011.

* cited by examiner

BATTERY PACK OF COMPACT STRUCTURE

TECHNICAL FIELD

The present invention relates to a battery pack of a compact structure, and, more particularly, to a battery pack including a battery cell array including two or more battery cells, each of which has an electrode assembly of a cathode/separator/anode structure disposed in a battery case together with an electrolyte in a sealed state, arranged in the lateral direction, a protection circuit module (PCM) connected to the upper end of the battery cell array to control the operation of the battery pack, a pack case in which the battery cell array and the protection circuit module are disposed, and a spacer mounted between the pack case and the battery cell array to provide a space accommodating the increase in thickness of the battery cell array during the charge and discharge of the battery pack.

BACKGROUND ART

Various kinds of combustible materials are contained in a secondary battery. As a result, the secondary battery may be heated or explode due to overcharge of the secondary battery, overcurrent in the secondary battery, or other external physical impact applied to the secondary battery. That is, the safety of the secondary battery is very low. Consequently, safety elements, such as a positive temperature coefficient (PTC) element and a protection circuit module (PCM), to effectively control an abnormal state of the secondary battery, such as overcharge of the secondary battery or overcurrent in the secondary battery, are disposed on a battery cell in a state in which the safety elements are connected to the battery cell.

Meanwhile, a secondary battery has a tendency for the thickness of the secondary battery to be increased when the secondary battery is charged and discharged for 300 to 500 cycles as compared with the thickness of the secondary battery before the secondary battery is charged and discharged. For example, after a secondary battery having a thickness of 6 mm is charged and discharged for 300 to 500 cycles, the thickness of the secondary battery is increased by 0.42 to 0.48 mm with the result that the secondary battery has a thickness of 6.42 to 6.48 mm.

Such increase in thickness of the secondary battery results in increase in thickness of a battery pack, including a single battery or a plurality of batteries, which is mounted in an external device. When the battery pack, the thickness of which has been increased, is assembled into a laptop computer or a mobile phone, an assembly process may be difficult or, according to circumstances, the assembly process may not be possible.

Up to now, a method of reducing the thickness of a portion of the inside part of a battery case, which is in contact with the side of an upper case or a lower case of the battery pack extending in the battery thickness direction, so as to compensate such increase in thickness of the battery pack has mainly been used.

The above method partially provides an effect of preventing the change in thickness of the battery pack due to expansion in thickness of the battery cells. Since the battery case is manufactured by plastic injection molding, however, a large quantity of defects, such as flow marks, unmolding, contraction and bending, occur during mass production of the battery case, which is designed so that the thickness of a portion of the battery case is smaller than that of the remaining portion of the battery case, through injection molding.

Therefore, there is a high necessity for a battery pack having a specific structure in which the thickness of a battery case is uniform, and the increase in thickness of the battery pack due to charge and discharge of battery cells is prevented.

Meanwhile, a battery pack mounted in a laptop computer requires high power and large capacity. To this end, a conventional cylindrical battery pack including a plurality of cylindrical battery cells has generally been used. In recent years, however, the size of a laptop computer has been reduced, and therefore, there is a high necessity for a slim type battery pack.

Therefore, there is a high necessity for a technology in which pouch-shaped battery cells are used to manufacture a slim type battery pack, thereby increasing capacity of the battery pack, and a spacer is mounted between a pack case and a battery cell array, thereby securing a space accommodating the increase in thickness of the battery cell array during the charge and discharge of the battery pack.

DISCLOSURE

Technical Problem

Therefore, the present invention has been made to solve the above problems, and other technical problems that have yet to be resolved.

Specifically, it is an object of the present invention to provide a battery pack including two or more battery cells configured to have a specific structure to provide high power and large capacity and spacers mounted between a pack case and a battery cell array, thereby securing a space accommodating the increase in thickness of the battery cell array during the charge and discharge of the battery pack.

It is another object of the present invention to provide a large capacity battery pack, which is manufactured using a simple and easy method and a manufacturing process of which is simplified, thereby reducing manufacturing costs of the battery pack.

Technical Solution

In accordance with one aspect of the present invention, the above and other objects can be accomplished by the provision of a battery pack including (a) a battery cell array including two or more battery cells, each of which has an electrode assembly of a cathode/separator/anode structure disposed in a battery case together with an electrolyte in a sealed state, arranged in the lateral direction, (b) a protection circuit module (PCM) connected to the upper end of the battery cell array to control the operation of the battery pack, (c) a pack case in which the battery cell array and the protection circuit module are disposed, and (d) a spacer mounted between the pack case and the battery cell array to provide a space accommodating the increase in thickness of the battery cell array during the charge and discharge of the battery pack.

That is, in the battery pack according to the present invention, the battery cells are arranged in the lateral direction based on desired capacity of the battery pack, the PCM is positioned at the upper end of the battery cell array, and the spacer is mounted between the pack case and the battery cell array. Consequently, it is possible to secure a space accommodating the increase in thickness of the battery cell array during the charge and discharge of the battery pack.

Consequently, it is possible to provide a space accommodating the increase in thickness of the battery cell array during the charge and discharge of the battery pack while uniformalizing the thickness of the pack case by the spacer mounted between the pack case and the battery cell array, thereby minimizing the overall increase in weight and size of the battery pack.

In addition, it is possible to uniformalize the thickness of the pack case as compared with a conventional battery pack structure in which the thickness of the pack case is locally reduced, thereby minimizing defects during injection molding.

According to the results of experiments carried out by the inventors of the present application, the thickness of a secondary battery after 300 to 500 cycles of charge and discharge of the secondary battery is 5 to 10% greater than the thickness of the secondary battery before charge and discharge of the secondary battery. For this reason, the spacer may have a thickness equivalent to 5 to 10%, preferably 7 to 8%, of the thickness of the battery cell array so as to offset such increase in thickness of the secondary battery.

In a preferred example, the pack case may be formed of a plastic material, and the spacer may be formed of a sheet member or a plastic material.

Consequently, the pack case according to the present invention can reduce the weight of the battery pack and can be easily applied to complex products as compared with a pack case formed of a metal material.

The sheet member may be formed of, preferably, a Nomex™ material. For reference, Nomex™ is a trademark of a flame-resistant meta-aramid material manufactured and sold by E.I. du Pont de Nemours and Company.

Meanwhile, the spacer is provided at the top and/or bottom thereof with an adhesive, by which the spacer is bonded to the outer side of the battery cell array. Consequently, it is possible to effectively prevent the spacer from moving out of position. Alternatively, the spacer may be formed of a double-sided adhesive tape.

The spacer may be mounted to the tops and bottoms of the battery cells at two or more edges thereof in a state in which the spacer has a predetermined width. In this structure, the spacer may have a width equivalent to 5 to 20% of the width of each of the battery cells.

If the width of the spacer is less than 5% of the width of each of the battery cells, the spacer may be damaged since the width of the spacer is excessively narrow. On the other hand, if the width of the spacer is greater than 20% of the width of each of the battery cells, a space to offset the increase in thickness of the battery cell array becomes insufficient, which is not preferable.

In a preferred example, the spacer may be a strip member.

In another preferred example, the spacer may be configured to have a lattice structure in which the spacer is simultaneously mounted to the battery cells in a state in which the tops or bottoms of the battery cells are exposed.

Meanwhile, the protection circuit module may include connection terminals connected to electrode terminals of the battery cells by resistance welding, metal plates to electrically connect the battery cells to each other, and a protection circuit to control the operation of the battery pack.

In a preferred example of the above-mentioned structure, the metal plates to electrically connect the battery cells to each other may be formed at the top of the protection circuit module. In this structure, it is possible to easily manufacture the PCM and to easily assemble the battery pack as compared with a conventional battery pack structure in which metal wires are formed at a layer in the protection circuit of the PCM so as to electrically connect battery cells to each other.

The battery cells may be selectively connected in series or in parallel to each other based on desired power and capacity of an external device in which the battery pack according to the present invention is installed. For example, the battery cells may be connected in parallel to each other if it is necessary for the battery cells to provide large capacity for a long time. On the other hand, the battery cells may be connected in series to each other if it is necessary for the battery cells to provide high power for a short time.

In another example of the above-mentioned structure, electrical connection regions between cathode terminals of the battery cells and the protection circuit module may be configured to have a structure in which conductive plates attached to tops of the respective connection terminals of the protection circuit module are welded so that the conductive plates surround the respective cathode terminals of the battery cells.

In the battery pack with the above-stated construction, therefore, the connection terminals of the protection circuit module and the cathode terminals of the battery cells are directly connected to each other with high welding coupling force via the conductive plates, which are configured to have a specific structure, and the battery cells are electrically connected in series and/or in parallel to each other via the metal plates included in the protection circuit module. Consequently, it is possible to easily manufacture a large capacity or high power battery pack through the use of a simple method.

For example, in a case in which a battery pack is constituted by three battery cells, the battery cells are arranged in the lateral direction to constitute a battery cell array, the battery cell array and a PCM are disposed at a pack case, and electrode terminals of the battery cells and connection terminals of the PCM are connected to each other by resistance welding, thereby manufacturing a desired battery pack.

Also, for a battery pack requiring high power, the metal plates included in the PCM are connected in series to each other in a state in which the electrode terminals of the battery cell array are welded to the connection terminals of the PCM. On the other hand, for a battery pack requiring long-term use, the metal plates included in the PCM are connected in parallel to each other in a state in which the electrode terminals of the battery cell array are welded to the connection terminals of the PCM. Consequently, it is possible to selectively manufacture a desired battery pack based on needs and uses thereof.

Specifically, the conductive plates may be attached to the connection terminals of the protection circuit module so that the conductive plates can be bent, the conductive plates may be bent in a bracket shape in a state in which the cathode terminals of the battery cells are placed on the conductive plates, and resistance welding may be carried out from above the bent portions of the conductive plates, thereby achieving physical coupling and electrical connection between the connection terminals of the protection circuit module and the cathode terminals of the battery cells.

The shape of the conductive plates is not particularly restricted so long as the conductive plates can be easily bent. For example, the conductive plates may be formed in an L shape in a state in which the conductive plates are attached to the corresponding connection terminals of the protection circuit module.

Each of the conductive plates may include a first connection part attached to the top of a corresponding one of the connection terminals of the protection circuit module and a second connection part attached to the top of the cathode terminal of a corresponding one of the battery cells. Consequently, the connection between the cathode terminals of the battery cells and the connection terminals of the protection circuit module is more securely achieved. In addition, when external force is applied to the battery pack, deformation of the electrical connection regions between the cathode terminals of the battery cells and the protection circuit module is prevented.

The material composing each of the conductive plates is not particularly restricted so long as the conductive plates can provide high coupling force when the conductive plates are welded as described above. Preferably, each of the conductive plates is a nickel plate, and each of the cathode terminals of the battery cells is an aluminum terminal.

Consequently, electric current from a resistance welding rod during resistance welding between the nickel plate and the aluminum terminal flows from the nickel plate, resistance of which is high, to the aluminum terminal, resistance of which is low, with the result that the resistance welding between the nickel plate and the aluminum terminal is easily achieved.

Preferably, the pack case includes a lower case, at which the battery cell array and the protection circuit module are disposed, and an upper case to cover the lower case so that the battery cell array and the protection circuit module are fixed in place.

The lower case may be partitioned into a battery cell mounting part, at which the battery cells are disposed, and a protection circuit module mounting part, at which the protection circuit module is disposed, and a partition wall may be formed at the interface between the battery cell mounting part and the protection circuit module mounting part. Also, openings, through which electrode terminals of the battery cells are exposed toward the protection circuit module, may be formed at portions of the partition wall corresponding to electrical connection regions between the electrode terminals of the battery cells and the protection circuit module.

In this pack case structure, it is possible to restrain contact between the electrode terminals of the battery cells and the parts of the protection circuit module since the partition wall is formed at the interface between the battery cell mounting part and the protection circuit module mounting part. Also, even when an electrolyte leaks from one or more of the battery cells, the electrolyte is prevented from flowing to the protection circuit module, thereby preventing the occurrence of a short circuit.

Also, since the openings, through which the electrode terminals of the battery cells are exposed toward the protection circuit module, are formed at portions of the partition wall corresponding to the electrical connection regions between the electrode terminals of the battery cells and the protection circuit module, it is possible to easily weld the electrode terminals of the battery cells, which are exposed through the openings, to the connection terminals of the protection circuit module.

The height of the partition wall may be sufficient to fully isolate the battery cell mounting part and the protection circuit module mounting part from each other.

The protection circuit module mounting part may be configured to have a structure including support parts to support the electrical connection regions between the electrode terminals of the battery cells and the protection circuit module.

The shape of the support parts is not particularly restricted so long as the support parts can easily support the electrical connection regions between the electrode terminals of the battery cells and the protection circuit module. For example, the support parts may be formed on the lower case in the shape of an upward protrusion.

Preferably, the support parts are formed in the shape of a cross-shaped protrusion. Consequently, it is possible for the support parts to more stably support the electrical connection regions between the electrode terminals of the battery cells and the protection circuit module during resistance welding between the electrode terminals of the battery cells and the protection circuit module.

The battery cell array may be constituted by arranging a plurality of battery cells in the lateral direction based on desired capacity of the battery pack as previously described. For example, the battery cell array preferably includes three battery cells for a device, such as a laptop computer, requiring long-term use and portability.

In the battery pack according to the present invention, any battery cells may be used in various manners irrespective of the kind and shape of the battery cells. A pouch-shaped secondary battery of an approximately hexahedral structure having a small thickness to width ratio, preferably a pouch-shaped lithium secondary battery, may be used as each battery cell of the battery pack.

According to circumstances, an external input and output terminal, which inputs electric current to the battery pack, outputs electric current from the battery pack, and transmits and receives information to and from the battery pack, may be mounted at the front of the protection circuit module in a depressed form.

In this structure, the battery pack can be stably connected to an external device through the external input and output terminal since the external input and output terminal is configured to have a connector structure.

In accordance with another aspect of the present invention, there is provided a laptop computer including the battery pack with the above-stated construction as a power source.

However, the battery pack according to the present invention may be manufactured so as to provide power and capacity required by a device by varying the number of battery cells constituting the battery pack. Of course, therefore, the battery pack according to the present invention can be applied to various devices requiring a variable battery capacity in addition to the laptop computer.

BRIEF DESCRIPTION OF DRAWINGS

The above and other objects, features and other advantages of the present invention will be more clearly understood from the following detailed description taken in conjunction with the accompanying drawings, in which.

DETAILED DESCRIPTION OF THE INVENTION

Now, exemplary embodiments of the present invention will be described in detail with reference to the accompanying drawings. It should be noted, however, that the scope of the present invention is not limited by the illustrated embodiments.

Figure 1:
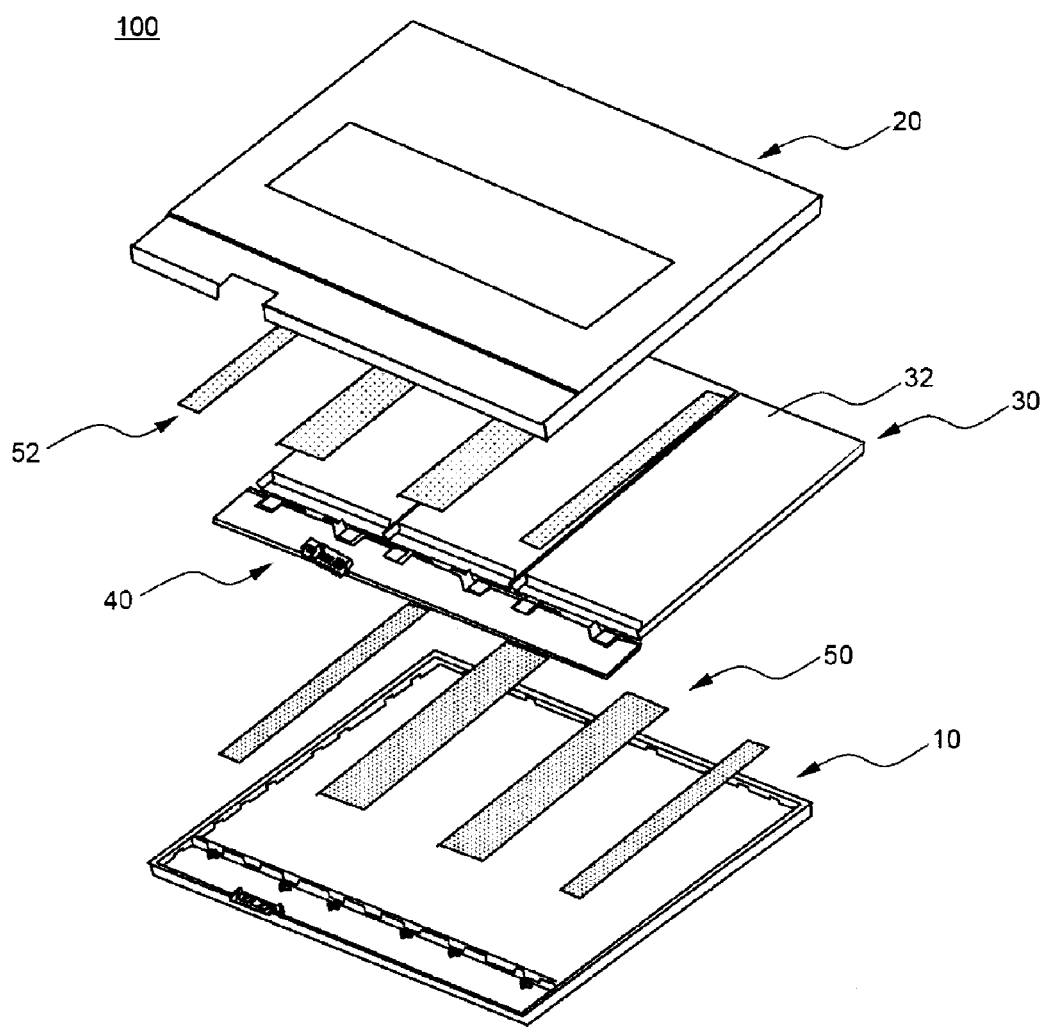
FIG. 1 is an exploded view showing a battery pack according to an embodiment of the present invention.

FIG. 1 is an exploded view typically showing a battery pack according to an embodiment of the present invention.

Referring to FIG. 1, a battery pack 100 includes a battery cell array 30 including three battery cells 32 arranged in the lateral direction, a protection circuit module 40 connected to the upper end of the battery cell array 30, a pack case 10 and 20 in which the battery cell array 30 and the protection circuit module 40 are disposed, and spacers 50 and 52 mounted between the pack case and the battery cell array 30.

Each of the battery cells 32 is a pouch-shaped secondary battery configured so that an electrode assembly having a cathode/separator/anode structure is disposed in a battery case together with an electrolyte in a sealed state. The pouch-shaped secondary battery is generally configured to have a plate-shaped structure, i.e. an approximately hexahedral structure having a small thickness to width ratio.

The pack cases include a lower case 10 to which the battery cell array 30 and the protection circuit module 40 are mounted and an upper case 20 disposed above the lower case 10 so that the upper case 20 covers the lower case 10 to fix the battery cell array 30 and the protection circuit module 40 in place.

The upper case 20 and the lower case 10 are formed of a plastic material, and the spacers 50 and 52 are formed of a double-sided adhesive tape, such as Nomex™.

The spacers 50 and 52 include an upper spacer 52 mounted to the top of a battery cell array 30 and a lower spacer 50 mounted to the bottom of the battery cell array 30. Each of the spacers 50 and 52 has a thickness equivalent to approximately 8% of the thickness of each of the battery cells 32.

Figure 2:
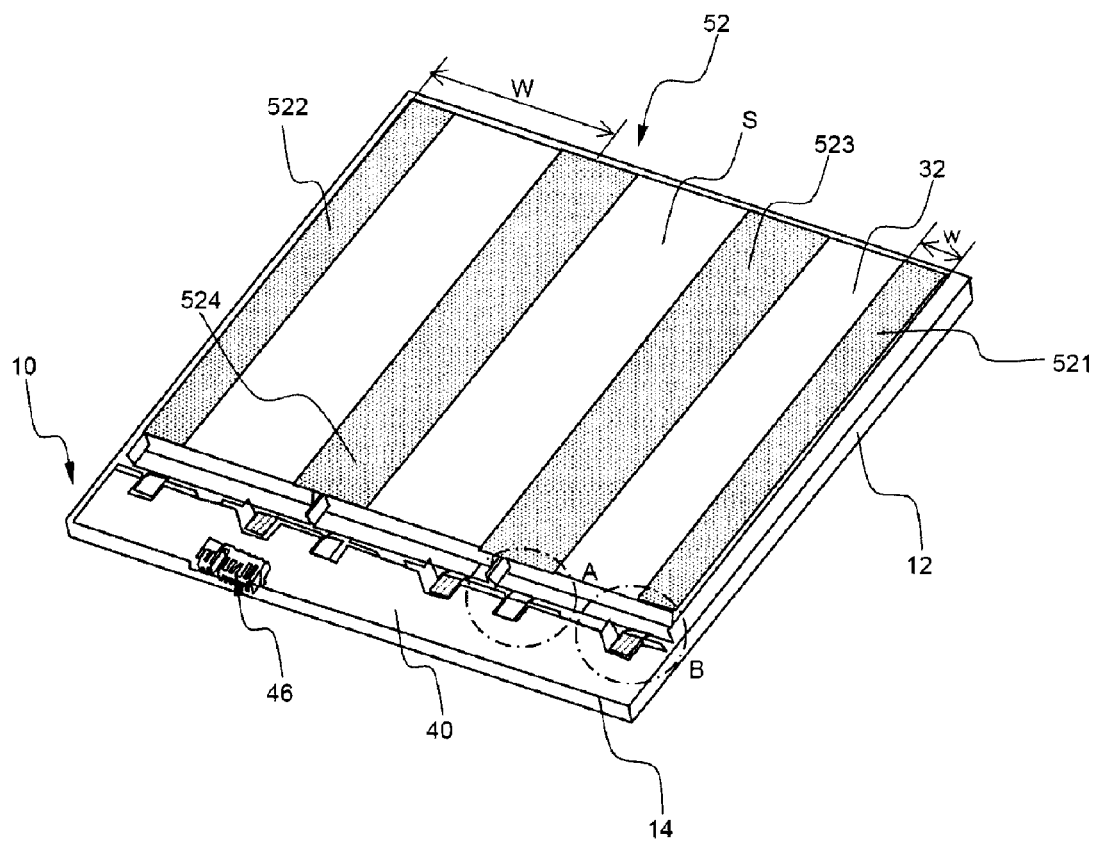
FIG. 2 is a perspective view showing a structure in which a spacer is mounted to the upper end of a battery cell array.

FIG. 2 is a perspective view typically showing a structure in which the spacer is mounted to the upper end of the battery cell array.

Referring to FIG. 2, the upper spacer 52 includes first upper spacers 523 and 524, each of which has a width w equivalent to approximately 20% of the width W of each of the battery cells 32, and second upper spacers 521 and 522, each of which has a width w equivalent to approximately 10% of the width W of each of the battery cells 32.

Consequently, the thickness of the battery cells 32 increased during the charge and discharge of the battery cells 32 is offset in spaces S defined between the first upper spacers 523 and 524 and the second upper spacers 521 and 522.

Also, the first upper spacers 523 and 524 and the second upper spacers 521 and 522 are mounted to the tops of the corresponding battery cells 32 at two edges thereof. The first upper spacers 523 and 524 and the second upper spacers 521 and 522 are formed in the shape of an elongated strip.

Figure 3:
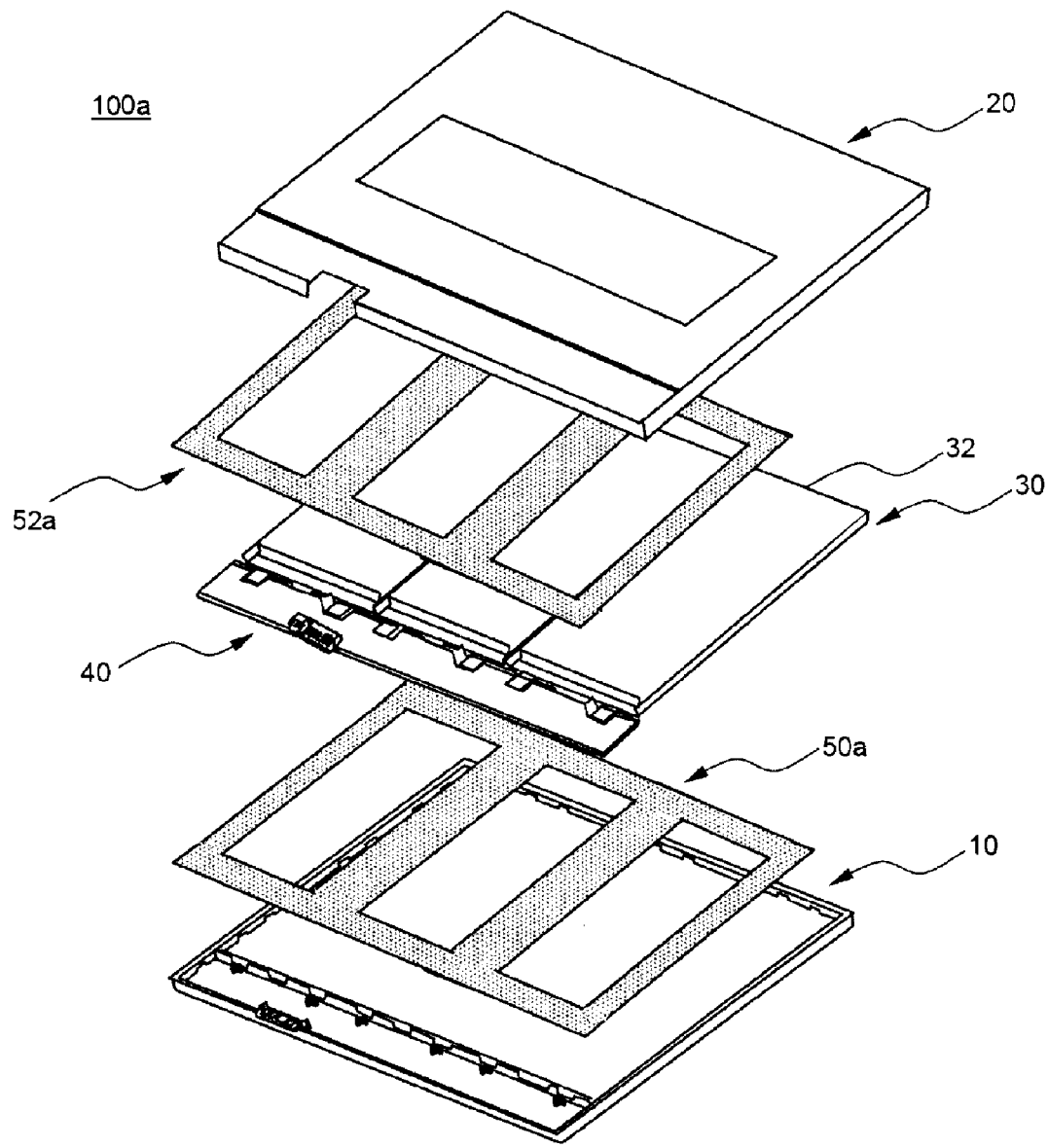
FIG. 3 is an exploded view showing a battery pack according to another embodiment of the present invention.
Figure 4:
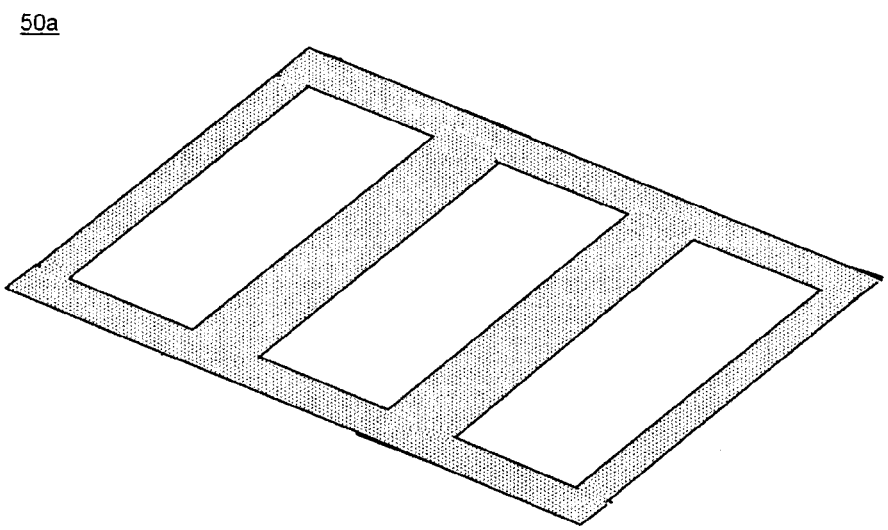
FIG. 4 is an enlarged view typically showing a spacer of FIG. 3.

FIG. 3 is an exploded view typically showing a battery pack according to another embodiment of the present invention, and FIG. 4 is an enlarged view typically showing a spacer of FIG. 3.

Referring to these drawings, spacers 50a and 52a are mounted to the tops and bottoms of battery cells 32 at four edges thereof. The spacers 50a and 52a are configured to have a lattice structure in which the spacers 50a and 52a are simultaneously mounted to the battery cells 32 in a state in which the tops or bottoms of the battery cells 32 are exposed.

Figure 5:
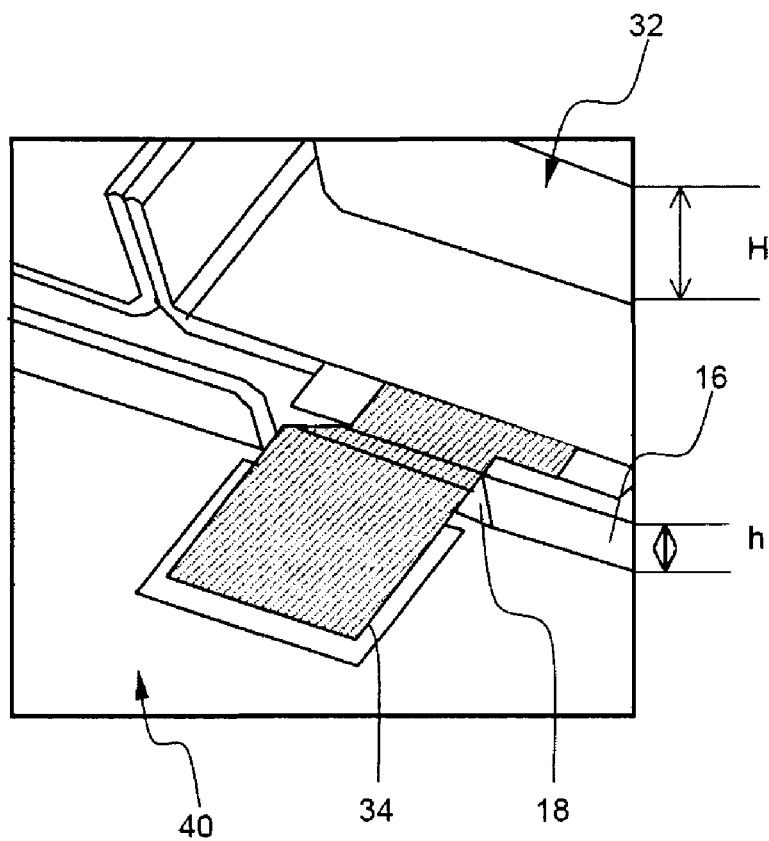
FIG. 5 is an enlarged view typically showing a region A of FIG. 2.
Figure 6:
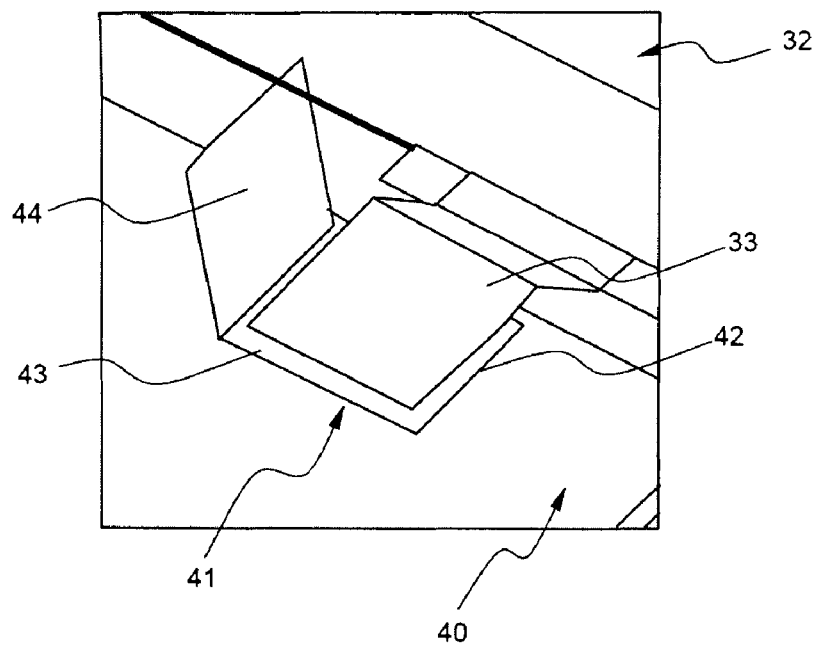
FIG. 6 is an enlarged view typically showing a region B of FIG. 2.

FIG. 5 is an enlarged view typically showing a region A of FIG. 2, and FIG. 6 is an enlarged view typically showing a region B of FIG. 2.

Referring to these drawings together with FIG. 2, the lower case 10 is partitioned into a battery cell mounting part 12, at which the battery cells 32 are disposed, and a protection circuit module mounting part 14, at which the protection circuit module 40 is disposed.

A partition wall 16 is formed at the interface between the battery cell mounting part 12 and the protection circuit module mounting part 14. Openings 18c, through which anode terminals 34 of the battery cells 32 are exposed toward the protection circuit module 40, are formed at portions of the partition wall 16 corresponding to electrical connection regions between the anode terminals 34 of the battery cells 32 and the protection circuit module 40.

The partition wall 16 has a height h sufficient to fully isolate the battery cell mounting part 12 and the protection circuit module 40 from each other. According to circumstances, a partition wall corresponding to the upper case (not shown) may be formed so as to achieve the above-mentioned isolation.

The protection circuit module 40 includes connection terminals 42 connected to cathode terminals 33 of the battery cells 32 by resistance welding, metal plates (not shown) to electrically connect the connection terminals 42 to each other, and a protection circuit (not shown) to control the operation of the battery pack.

An electrical connection region B between the cathode terminal 33 of each of the battery cells 32 and the protection circuit module 40 is configured to have a structure in which a conductive plate 41 attached to a corresponding one of the connection terminals 42 of the protection circuit module 40 surrounds the cathode terminal 33 of each of the battery cells 32.

Also, the conductive plate 41, which may be a nickel plate, includes a first connection part 43 attached to the top of the corresponding connection terminal 42 of the protection circuit module 40 and a second connection part 44 attached to the top of the cathode terminal, which may be an aluminum terminal, of the corresponding battery cell 32.

Specifically, the conductive plate 41 is attached to the top of the corresponding connection terminal 42 of the protection circuit module 40 in an L shape. The conductive plate 41 is bent in a bracket shape in a state in which the cathode terminal 33 of the corresponding battery cell 32 is placed at the top of the first connection part 43 of the conductive plate 41, and then resistance welding is carried out from above the second connection part 44, which is a bent portion of the conductive plate 41.

Meanwhile, an external input and output terminal, i.e. a connector 46, which inputs electric current to the battery pack, outputs electric current from the battery pack, and transmits and receives information to and from the battery pack, is mounted at the front of the protection circuit module 40 in a depressed form.

Figure 7:
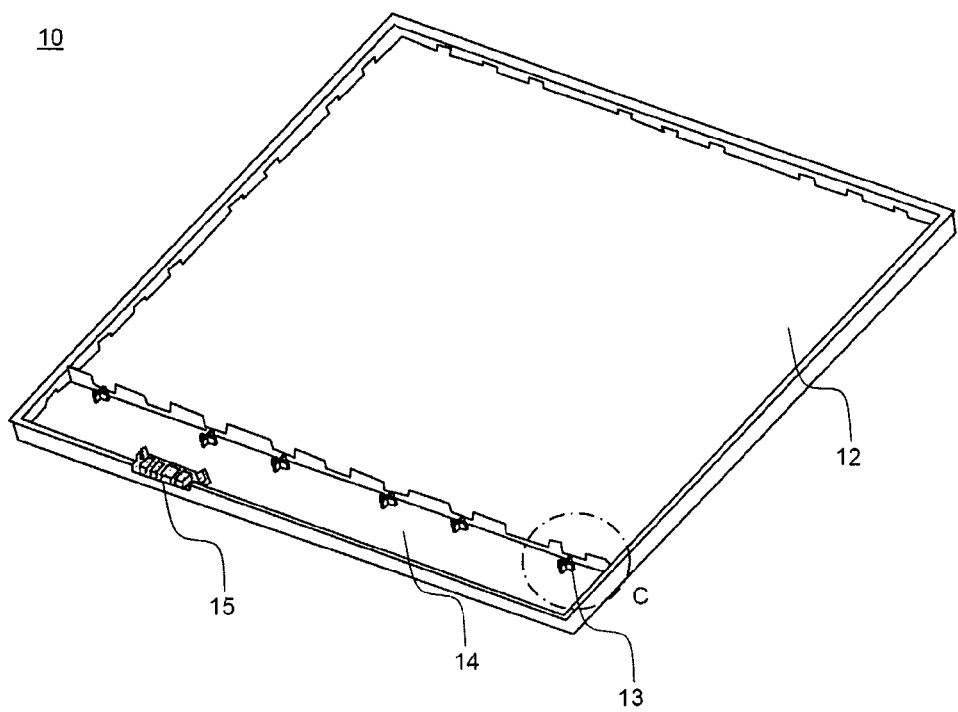
FIG. 7 is a perspective view of a lower case.
Figure 8:
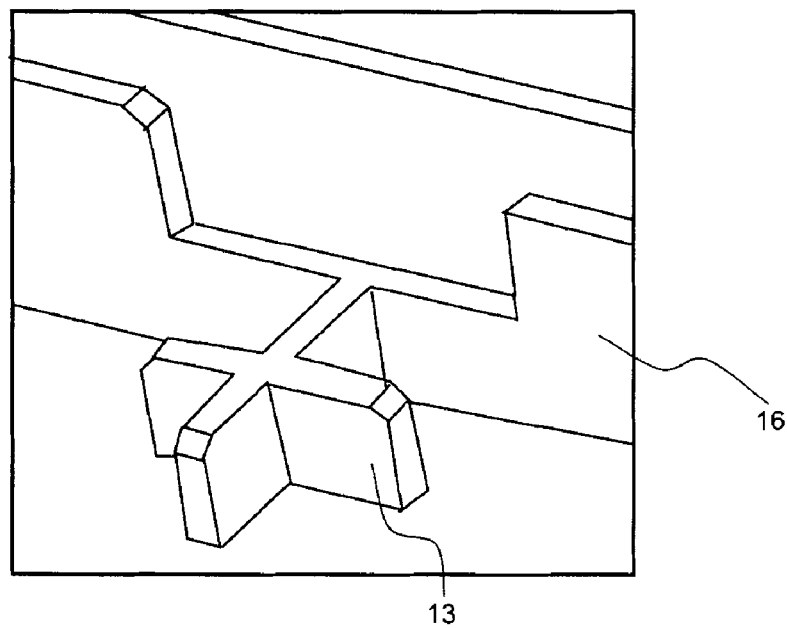
FIG. 8 is an enlarged view typically showing a region C of FIG. 7.

FIG. 7 is a perspective view typically showing the lower case, and FIG. 8 is an enlarged view typically showing a region C of FIG. 7.

Referring to these drawings together with FIGS. 2 and 6, an external input and output terminal mounting part 15, in which the external input and output terminal 46, which inputs electric current to the battery pack, outputs electric current from the battery pack, and transmits and receives information to and from the battery pack, is mounted, is formed at the protection circuit module mounting part 14 of the lower case 10.

Also, a support part 13 to support the electrical connection region between the cathode terminal 33 of each of the battery cells 32 and the protection circuit module 40 is formed on the lower case 10 in the shape of an upward cross-shaped protrusion in a state in which the support part 13 is connected to the partition wall 16. The support part 13 appropriately supports downward pressure applied by a welding tip (not shown) to be located above the cathode terminal 33 of each of the battery cells 32 during resistance welding, thereby providing high welding force.

Figure 9:
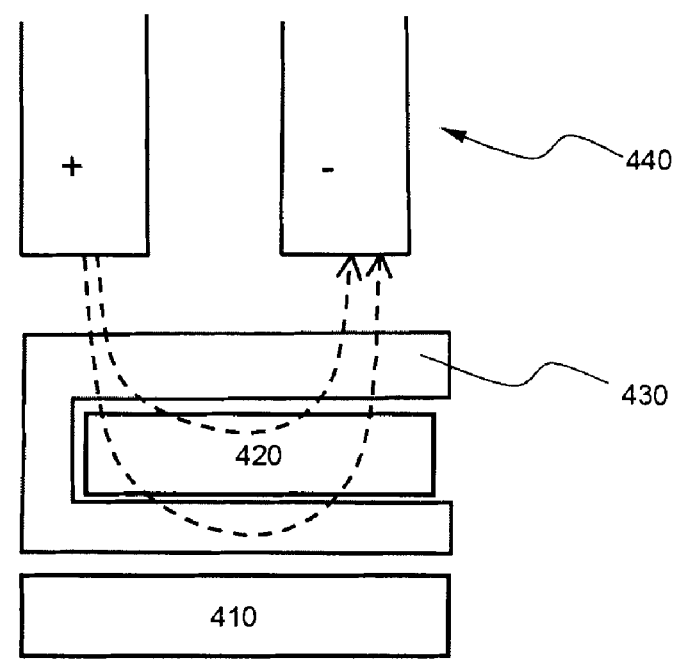
FIG. 9 is a typical view showing a resistance welding structure of the present invention.

FIG. 9 is a typical view showing a resistance welding structure of the present invention.

Referring to FIG. 9, electric current generated from a resistance welding rod 440 during resistance welding between a nickel plate 430, located at the top of a protection circuit board 410, and an aluminum terminal 420 flows from the nickel plate 430, resistance of which is high, to the aluminum terminal 420, resistance of which is low, and then flows back to the nickel plate 430. At this time, heat is generated from the interface between the aluminum terminal 420 and the nickel plate 430 due to resistance difference therebetween with the result that the resistance welding between the nickel plate 430 and the aluminum terminal 420 is easily achieved.

Figure 10:
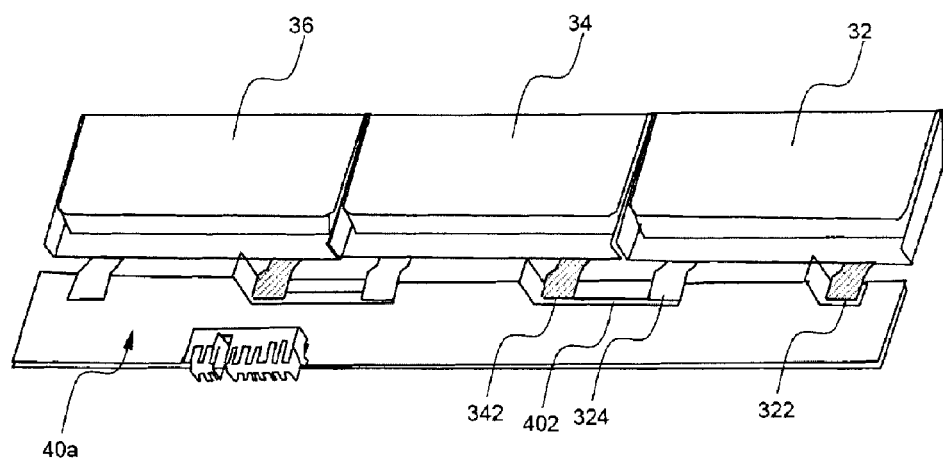
FIG. 10 is a partial perspective view showing a structure in which a plurality of pouch-shaped battery cells according to another embodiment of the present invention is electrically connected to each other.
Figure 11:
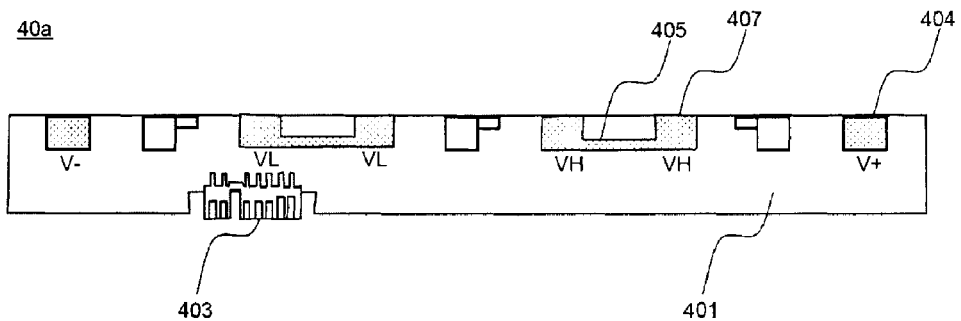
FIG. 11 is an enlarged plan view typically showing a protection circuit module (PCM) of FIG. 10.

FIG. 10 is a partial perspective view typically showing a structure in which a plurality of pouch-shaped battery cells according to another embodiment of the present invention is electrically connected to each other, and FIG. 11 is an enlarged plan view typically showing a protection circuit module (PCM) of FIG. 10.

Referring to these drawings, metal plates 402 to electrically connect battery cells 32, 34 and 36 to each other are formed at the top of a protection circuit module 40a in a structure in which an anode terminal 324 of the first battery cell 32 is connected in series to a cathode terminal 342 of the second battery cell 34.

Also, the protection circuit module 40a includes a PCM main body 401 having a protection circuit to control overcharge, overdischarge and overcurrent, connection terminals 404 and 407 formed at positions of the PCM main body 401 corresponding to the electrode terminals of the battery cells 32, 34 and 36 so as to directly electrically connect the battery cells 32, 34 and 36 to each other, metal plates 405 formed at the top of the PCM main body 401 to electrically connect the connection terminals 404 and 407 to each other, and an external input and output terminal 403 mounted at the front of the PCM main body 401 in a depressed form to input electric current to the battery pack, to output electric current from the battery pack, and to transmit and receive information to and from the battery pack.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery pack according to the present invention includes two or more battery cells configured to have a specific structure to provide high power and large capacity and spacers mounted between a pack case and a battery cell array. Consequently, it is possible to secure a space accommodating the increase in thickness of the battery cell array during the charge and discharge of the battery pack.

Also, an electrical connection region between a cathode terminal of each of the battery cells and a protection circuit module is welded to have a structure in which a conductive plate attached to a corresponding connection terminal of the protection circuit module surrounds the cathode terminal of each of the battery cells. Consequently, it is possible to manufacture a battery pack of a compact structure and high weldability.

The invention claimed is:

1. A battery pack comprising:
   (a) a battery cell array comprising two or more battery cells, each of which has an electrode assembly of a structure including cathode, separator and anode disposed in a battery case together with an electrolyte in a sealed state, arranged in a lateral direction;
   (b) a protection circuit module (PCM) connected to an upper end of the battery cell array to control an operation of the battery pack;
   (c) a pack case in which the battery cell array and the protection circuit module are disposed; and
   (d) a spacer mounted between the pack case and the battery cell array to provide a space accommodating the increase in thickness of the battery cell array during charge and discharge of the battery pack,
   wherein the spacer is configured to have a lattice structure in which the spacer is simultaneously mounted to the battery cells in a state in which the tops or bottoms of the battery cells are exposed,
   wherein the spacer has a width equivalent to 5 to 20% of a width of each of the battery cells,
   wherein a width of a portion of the spacer at edges between the battery cells is twice a width of a portion of the spacer at side edges of the battery cell array,
   wherein the pack case comprises a lower case at which the battery cell array and the protection circuit module are disposed and an upper case to cover the lower case so that the battery cell array and the protection circuit module are fixed in place,
   wherein the lower case is partitioned into a battery cell mounting part, at which the battery cells are disposed, and a protection circuit module mounting part, at which the protection circuit module is disposed, and
   wherein a partition wall is formed at an interface between the battery cell mounting part and the protection circuit module mounting part, and recesses, through which electrode terminals of the battery cells are exposed toward the protection circuit module, are formed in a top edge of the partition wall at portions corresponding to electrical connection regions between the electrode terminals of the battery cells and the protection circuit module.

2. The battery pack according to claim 1, wherein the spacer has a thickness equivalent to 5 to 10% of a thickness of the battery cell array.

3. The battery pack according to claim 1, wherein the pack case is formed of a plastic material, and the spacer is formed of a sheet member or a plastic material.

4. The battery pack according to claim 1, wherein the spacer is provided at a top and/or bottom thereof with an adhesive, by which the spacer is positioned on an outer side of the battery cell array.

5. The battery pack according to claim 1, wherein the spacer is mounted to tops and bottoms of the battery cells at two or more edges thereof in a state in which the spacer has a predetermined width.

6. The battery pack according to claim 1, wherein the spacer is a strip member.

7. The battery pack according to claim 1, wherein the protection circuit module comprises connection terminals connected to electrode terminals of the battery cells by resistance welding, metal plates to electrically connect the battery cells to each other, and a protection circuit to control the operation of the battery pack.

8. The battery pack according to claim 7, wherein the metal plates to electrically connect the battery cells to each other are formed at a top of the protection circuit module.

9. The battery pack according to claim 7, wherein electrical connection regions between cathode terminals of the battery cells and the protection circuit module are configured to have a structure in which conductive plates attached to tops of the respective connection terminals of the protection circuit module are welded so that the conductive plates surround the respective cathode terminals of the battery cells.

10. The battery pack according to claim 9, wherein each of the conductive plates comprises a first connection part attached to the top of a corresponding one of the connection terminals of the protection circuit module and a second connection part attached to a top of the cathode terminal of a corresponding one of the battery cells.

11. The battery pack according to claim 9, wherein each of the conductive plates is a nickel plate, and each of the cathode terminals of the battery cells is an aluminum terminal.

12. The battery pack according to claim 1, wherein the protection circuit module mounting part comprises support parts to support the electrical connection regions between the electrode terminals of the battery cells and the protection circuit module.

13. The battery pack according to claim 1, wherein the battery cell array comprises three battery cells.

14. The battery pack according to claim 1, wherein each of the battery cells is a pouch-shaped secondary battery.

15. The battery pack according to claim 1, wherein an external input and output terminal, which inputs electric current to the battery pack, outputs electric current from the battery pack, and transmits and receives information to and from the battery pack, are mounted at a front of the protection circuit module in a depressed form.

16. A laptop computer comprising a battery pack according to claim 1 as a power source.

\* \* \* \* \*